United States Patent [19]

Kreft

[11] Patent Number: 4,652,821

[45] Date of Patent: Mar. 24, 1987

[54] DEVICE INCLUDING SELECTIVELY ACTUATABLE SENSORS AND A MULTIPLEXER-DEMULTIPLEXER FOR CONTACT-FREE POSITIONAL MEASUREMENT OF ELECTRONIC POSITION INDICATORS

[75] Inventor: Hans-Dietrich Kreft, Rosenweg, Fed. Rep. of Germany

[73] Assignee: Angewandte Digital Elektronik GmbH, Fed. Rep. of Germany

[21] Appl. No.: 557,440

[22] Filed: Dec. 2, 1983

[30] Foreign Application Priority Data

Dec. 4, 1982 [DE] Fed. Rep. of Germany ....... 3244891

[51] Int. Cl.$^4$ .................. G01B 7/14; G08C 19/04; G08C 19/06; G08C 19/30
[52] U.S. Cl. .................... 324/208; 340/518; 340/870.13; 340/870.31; 340/870.38
[58] Field of Search ............... 324/207, 208, 209, 235, 324/232, 243; 340/686, 870.31, 870.32, 870.38, 572, 870.13, 870.15, 517, 518; 73/313

[56] References Cited

U.S. PATENT DOCUMENTS

| | | | |
|---|---|---|---|
| 2,805,677 | 9/1957 | Baird | 324/207 X |
| 3,286,161 | 11/1966 | Jones et al. | 324/207 X |
| 3,846,771 | 11/1974 | Young et al. | 324/208 X |
| 3,906,469 | 9/1975 | Kronk | 324/208 X |
| 4,088,946 | 5/1978 | Charles et al. | 324/235 X |
| 4,110,688 | 8/1978 | Bailey | 324/208 |
| 4,262,287 | 4/1981 | McLoughlin et al. | 340/870.13 X |
| 4,288,747 | 9/1981 | Kawabata et al. | 324/243 X |
| 4,308,530 | 12/1981 | Kip et al. | 340/572 |
| 4,466,284 | 8/1984 | Dumery | 324/251 X |
| 4,481,469 | 11/1984 | Hauler et al. | 324/235 X |
| 4,502,006 | 2/1985 | Goodwin et al. | 324/208 |

FOREIGN PATENT DOCUMENTS 0160605 12/1981 Japan .................... 324/208

*Primary Examiner*—Gerard R. Strecker

[57] ABSTRACT

Given a device for contact-free position measurement, a movable or resting part that represents a load in an alternating field or that is designed as an element emitting field lines is spatially neighbored by a sensor carrier that exhibits a plurality of individual sensors that are electrically and spatially separated from one another, whereby each of said individual sensors can be applied to direct or alternating voltage, and whereby an interrogation and evaluation means is provided, to which each of the individual sensors is connectable for the purpose of identifying its output signal that is dependent on the position of the positionally variable or resting position indicator.

2 Claims, 4 Drawing Figures

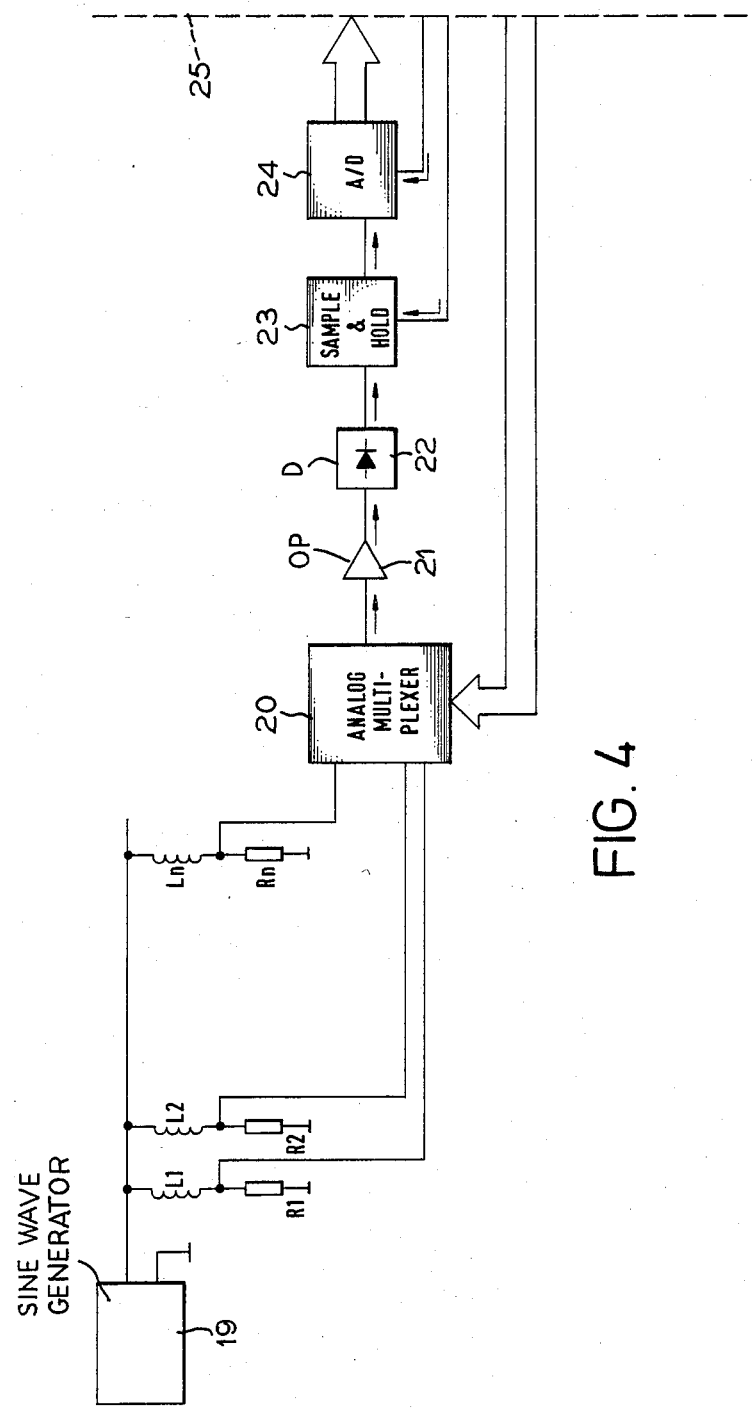

DEVICE INCLUDING SELECTIVELY ACTUATABLE SENSORS AND A MULTIPLEXER-DEMULTIPLEXER FOR CONTACT-FREE POSITIONAL MEASUREMENT OF ELECTRONIC POSITION INDICATORS

BACKGROUND OF THE INVENTION

1. Field of the Invention

The invention relates to a means for contact-free positional measurements on an electric/electronic or magnetic/electronic basis that is suitable for executing mechanically uninfluenced, electronically evaluatable positional measurements of a moving or resting part of the position indicator, particularly length measurements as well.

2. Description of the Prior Art

Known under the designation "differential transformers" are systems which measure the immersion depth of a core in a coil or a pair of coils as an electric signal which can be converted into length units over a calibration table. Differential transformers also function contact-free but have the disadvantage that the absolute quantity of the output signal—into which all environmental influences such as temperature, fluctuations of the electric parameters, distance of the ferrite from the coils, naturally enter—also has an influence on the precision of the length measurement. Given differential transformers, in particular, a precise electronic null balance that specifies the neutral position of the introduced ferrite between the coils is required. Thus, it is necessary to calibrate the transformers to determine the neutral position.

SUMMARY OF THE INVENTION

The basic features of the invention consist of an element representing a load or emitting field lines being provided in an electromagnetic alternating field as a position indicator at a movable or resting part subject to the positional identification. A sensor carrier is disposed spatially adjacent to the first element, the sensor carrier including a plurality of individual sensor elements electrically separated from one another, whereby each of the individual sensors can be applied to direct or alternating voltage. An interrogation and evaluation means is provided to which each of the individual sensors can be connected for the purpose of identifying its output signal which is dependent on the position of the positionally variable or resting position indicator.

Another possible embodiment of the inventive idea is provided wherein the position indicator consists of a coil and the sensor carrier is formed of individual coil windings that are separated from one another.

Another possible embodiment of the invention is provided wherein the position indicator is a permanent magnet and the sensor carrier includes individual sensors in the form of sensors that are sensitive to the magnetic field.

An object of the invention is to determine a clear allocation between the electronic signal and position or length independently of environmental influences and fluctuations of electric parameters without a calibration of electrical quantities in position or length units being required, and whereby the recognition of the position or longitudinal position of the position indicator is immediately provided as soon as the apparatus is switched on and without calibration.

A particular characteristic of the invention is that a mechanical rotor or an electronic multiplexer is provided to which the individual sensors are connectible for the purpose of a separate transfer of their output signals. With the assistance of a suitable electronic evaluation means, for example, a microprocessor system, the phenomenological characteristic, such as maximum or minimum of the values of the sensors combined into a curve, is employed as the index for the position of the position indicator and not the scalar value such as height.

BRIEF DESCRIPTION OF THE DRAWINGS

FIG. 4 is a schematic block diagram of an alternative embodiment of the present invention utilizing individual coil sensors.

DESCRIPTION OF THE PREFERRED EMBODIMENTS

Figure 1:
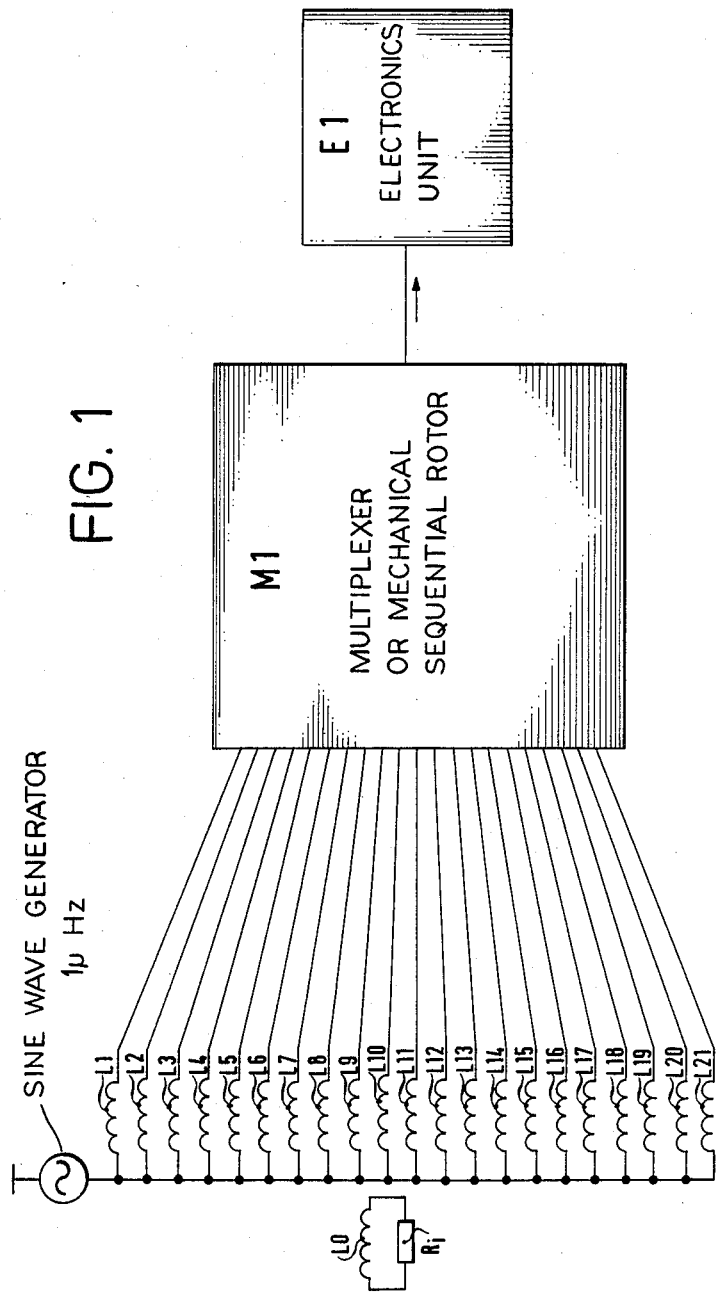
FIG. 1 is a schematic block diagram of an embodiment of the present invention.

In FIG. 1 the coils $L1$ through $L21$ are disposed adjacent to and opposite the coil $L0$ with its load resisor $Ri$. The coil $L0$ is disposed on a carrier for example, a ferrite, and is terminated over the resistor $Ri$, for example, the resistance of the coil wire. The coil $L0$ thus represents a load in an electromagnetic alternating field.

The coils $L1$ through $L21$ are wound in a traditional manner and are likewise applied to carriers. All coils $L1$ through $L21$ are applied to different ferrites in the same mechanical disposition with defined spacing, being applied electrically and spatially separated from one another. When a voltage pulse or an alternating electric signal is successively or simultaneously applied to the individual coils, the signals at the individual coils $L1$ through $L21$ differ depending on what position the coil $L0$ as the position indicator is in relation to one of the coils $L1$ to $L21$ lying opposite. When, thus, the individual coils are interrogated with the auxiliary $Ml$, i.e., a mechanical rotor in the simplest case, but preferably an electronic multiplexer, the different signal inputs are one direct measure for the position of $L0$. Given a uniform disposition of the coils $L1$ through $L21$ (the numbers can be arbitrarily selected), the relationship between electronic signal and position can be easily identified, since the overall length of the provided coils need only be divided by their plurality and each coil thus precisely marks one position with its signal.

A more schematic illustration is provided in FIG. 4. The individual coils $L1$, $L2$ through $Ln$ are fed by a sine wave generator 19 and are grounded through the individual resistors $R1$, $R2$ through $Rn$. An analog multiplexer 20 successively connects the individual coils to a micro-processor system 25 through an operational amplifier 21, a rectifiction 22 such as a diode, a sample and hold circuit means 23 and an analog-to-digital converter 24.

Figure 3:
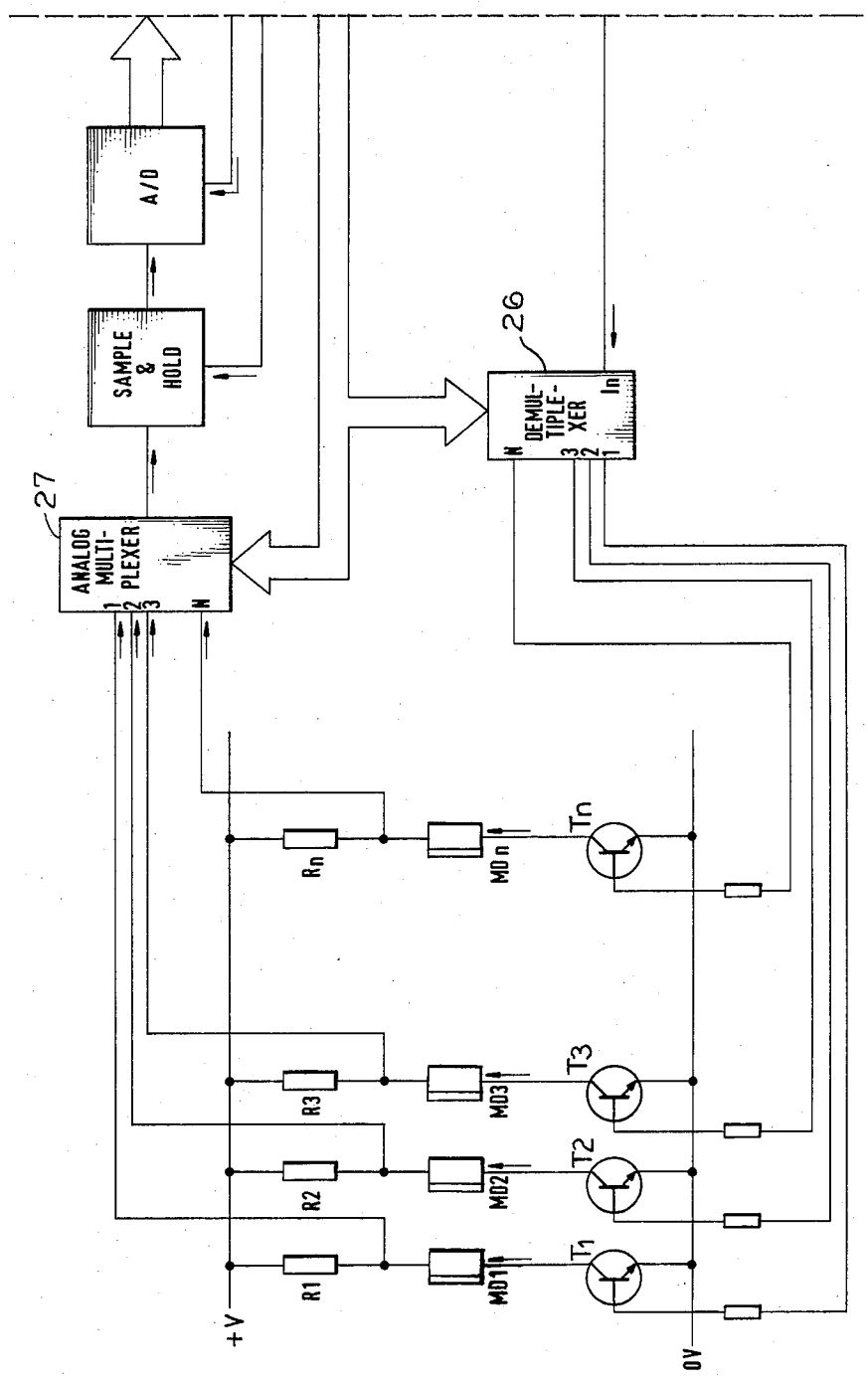
FIG. 3 is a schematic block diagram of an alternative embodiment of the present invention utilizing magnetic diodes.

A length and position sensor is constructed with magnetodiodes in FIG. 3. In order to achieve a low power consumption of the magneto-diodes $MD1$ to $MDn$ applied in parallel, they are individually grounded by a demultiplexer 26 and through transistors $T1$ to $Tn$. The voltage drops at the magneto-diodes across the resistors R1 through Rn are interrogated by an analog multiplexer at the same time.

Figure 2:
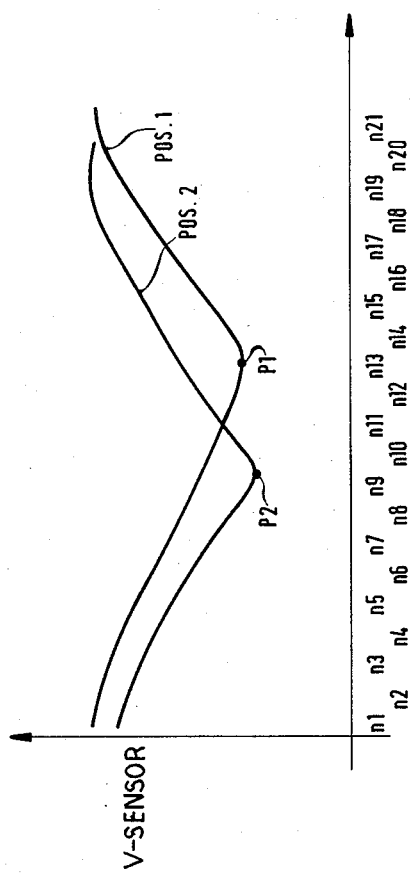
FIG. 2 is a schematic diagram of output voltages of the individual sensors of FIG. 1.

The different sensor signals (V-sensor) are illustrated in FIG. 2 as a function of the positions of the individual sensors n1 through n21. As can be seen, different curve progressions derive for the different positions of the position indicator (position 1 or position 2). The position for the position indicator is respectively given where the sensor voltage has its minimum, at the points P1, P2. As can be seen, it is not the quantitative characteristic of the points P1, P2 (level of the voltage signal) that is characteristic of the position of the position indicator, rather the phenomenological part of a minimum of this curve. The electronics unit E1 shown in FIG. 1 can easily interpret this phenomenon and directly indicate the position of the position indicator in length units.

The fact that electric leads to the moved part and, thus, wear of contacts, stresses on line connections and leads due to motion are eliminated provide advantages with this system. Further, contact contaminations are not present with this system, so inaccuracies due to such a construction are not present.

The invention enables a precisely prescribed geometrical arrangement of the sensor elements based on unit, for example length and spacing, as well as based on shape, for example a curved disposition of the sensor elements, whereby the specification of a position can be carried out in absolute units. The placement of the position indicator on a circular path (door position, brake pedal position, backrest, angle indicator and the like) is thus also available.

To be emphasized, finally, as a very significant advantageous feature is the employment of multiplexing which, among other things, enables the position of the indicator to be likewise acquired in the idle position of the position indicator as well as when the electronics unit is turned on (without calibration run), this in turn assuring that the unequivocal position of a part, for example a valve, is already ascertainable upon switch-on.

A further advantage of this system is that there is no need for a precise mechanical adjustment. The position indicator need not reside in a precisely prescribed and identical distance from the sensors; it is sufficient for the distance of the position indicator from the sensor elements to be in a certain tolerance range. Further, null point calibration is not required for the system. It suffices that the system be informed (for example, by pressing a button) that P2 is to be the zero position. The electronics unit can store this value and indicate all deviations from this value—both toward plus as well as minus—as positional deviations with the correct operational sign. The zero or null point is thus arbitrarily selectable. The precision of the system is essentially determined by the possible plurality of individual coils on a length unit. When suitable manufacturing methods for the sensors are selected, such as are currently standard in semiconductor technology, the precision of the positional identification can be very high. The length of the excursion measurement is freely selectable within broad ranges and essentially depends only on the lead-out of the plurality of sensor terminals.

A further advantage of the inventive system is that the position of the position indicator is given immediately when the system is turned on without motion of the position indicator having to occur. This is particularly advantageous when starting valves, given that the position assumed by the valve is frequently unknown during the start-up event.

It can be seen that excursions of valves, vibrator conveyors and similarly movable parts are easily possible in absolute length units with this system. The length is measured via the electronics unit and the moved system is informed by a motor operator, a phase controller, finely regulated power supply, as to what position is to be observed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An electronic device for contact-free positional measurement, comprising:
    a position indicator corresponding to a movable or resting part whose position is to be determined and identified,
    a plurality of selectively activatable sensors connected in parallel across a power source and carried in a sensor carrier, said position indicator and said sensors being movable with respect to one another such that said position indicator is spacially adjacent individual ones of said sensors sequentially during said movement to electromagnetically sense said position indicator, whereby said sensors sense the position of said position indicator,
    a multiplexer having a plurality of inputs connected to respective ones of said sensors for serial transfer of their output signals,
    an evaluation circuit connected to said multiplexer to compare multiplexed signals from said plurality of sensors, and
    means for selectively activating each sensor, said activating means including:
    a demultiplexer having a plurality of outputs,
    a plurality of active elements connected as switches in series with respective ones of said sensors, each of said active elements having a switch activating input connected to a respective one of said demultiplexer outputs and being turned on to activate its series connected sensor by means of said power source upon receipt of a signal from said respective demultiplexer output,
    whereby said evaluation circuit determines the position of said position indicator with respect to said plurality of sensors regardless of whether in an idle position or when the electronic device is turned on without pre-calibration, thus insuring unequivocal ascertainment of a position of the position indicator part.

2. A device as claimed in claim 1, wherein said active elements each comprise a bipolar transistor and said sensors each including magneto-diodes, and further comprising:
    a plurality of first resistors connected between respective ones of said plurality of demultiplexer outputs and a base input of said bipolar transistors, and
    a plurality of second resistors connected in series with respective ones of said magneto-diodes.

* * * * *